United States Patent
Otsuka et al.

(10) Patent No.: US 9,835,458 B2
(45) Date of Patent: Dec. 5, 2017

(54) SHIP ASSIGNMENT DEVICE, SHIP ASSIGNMENT METHOD, PROGRAM, AND RECORDING MEDIUM

(71) Applicant: NIPPON YUSEN KABUSHIKI KAISHA, Tokyo (JP)

(72) Inventors: Yuji Otsuka, Tokyo (JP); Atsushi Yamaguchi, Tokyo (JP); Masaharu Urabe, Tokyo (JP); Ryo Kakuta, Tokyo (JP)

(73) Assignee: NIPPON YUSEN KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 14/894,056

(22) PCT Filed: May 28, 2013

(86) PCT No.: PCT/JP2013/064706
§ 371 (c)(1),
(2) Date: Apr. 15, 2016

(87) PCT Pub. No.: WO2014/192071
PCT Pub. Date: Dec. 4, 2014

(65) Prior Publication Data
US 2016/0282125 A1    Sep. 29, 2016

(51) Int. Cl.
*G01C 21/20* (2006.01)
*B63B 49/00* (2006.01)
(52) U.S. Cl.
CPC ............ *G01C 21/203* (2013.01); *B63B 49/00* (2013.01)
(58) Field of Classification Search
CPC ............................ G01C 21/203; B63B 49/00
(Continued)

(56) References Cited

U.S. PATENT DOCUMENTS 8,594,866 B1 * 11/2013 Chen .................... B60L 3/00
  701/21
8,935,174 B2 * 1/2015 Chen .................. G06Q 10/06
  701/21
2013/0124088 A1 * 5/2013 Bruce .................. G01C 21/20
  701/527

FOREIGN PATENT DOCUMENTS

JP    08-272402 A    10/1996
JP    2006-260155 A   9/2006
(Continued)

OTHER PUBLICATIONS

Notification of Reasons for Refusal for corresponding Japanese Patent Application No. 2014-504512, dated Sep. 30, 2014, pp. 1-3.
(Continued)

*Primary Examiner* — Marthe Marc-Coleman
(74) *Attorney, Agent, or Firm* — MKG, LLC

(57) ABSTRACT

A ship assignment device acquires voyage schedule information including an operation time schedule and a sailing route of a voyage. The ship assignment device acquires, from a database, weather information related to the operation time schedule and the sailing route included in the schedule information. The ship assignment device acquires information regarding variations in fuel consumption rate from a database that stores the information for each of plural ships. On the basis of the acquired weather information and acquired information regarding each ship, the ship assignment device calculates the fuel consumption for when each ship sails on the sailing route included in the acquired voyage schedule information in accordance with the operation time schedule included in the voyage schedule information. On the basis of the calculation result, the ship assignment device outputs information identifying plural ships.

7 Claims, 4 Drawing Sheets

(58) Field of Classification Search
USPC .................................. 701/21; 705/7.27, 7.11
See application file for complete search history.

(56) References Cited

FOREIGN PATENT DOCUMENTS

JP        2007-57499 A     3/2007
JP        2012-250649 A    12/2012

OTHER PUBLICATIONS

Notification of Reasons for Refusal for corresponding Japanese Patent Application No. 2014-2014-504512, dated Mar. 20, 2014, pp. 1-3.
Written Opinion issued in corresponding PCT Application No. PCT/JP2013/064706 dated Aug. 27, 2013, pp. 1-4.
International Search Report issued in corresponding PCT Application No. PCT/JP2013/064706 dated Aug. 27, 2013.

\* cited by examiner

| SHIP NAME | OVERALL LENGTH | MOLDED BREADTH | DEADWEIGHT CAPACITY | MOLDED DEPTH | FULL LOAD DRAFT |
|---|---|---|---|---|---|
| A | ... | ... | ... | ... | ... |
| B | ... | ... | ... | ... | ... |
| ⋮ | ⋮ | ⋮ | ⋮ | ⋮ | ⋮ |

SHIP "A"  SHIP "B"

| WIND DIRECTION | WIND SPEED | WAVE DIRECTION | WAVE HEIGHT | SAILING SPEED | FUEL CONSUMPTION RATE |
|---|---|---|---|---|---|
| ... | ... | ... | ... | ... | ... |
| ... | ... | ... | ... | ... | ... |
| ⋮ | ⋮ | ⋮ | ⋮ | ⋮ | ⋮ |

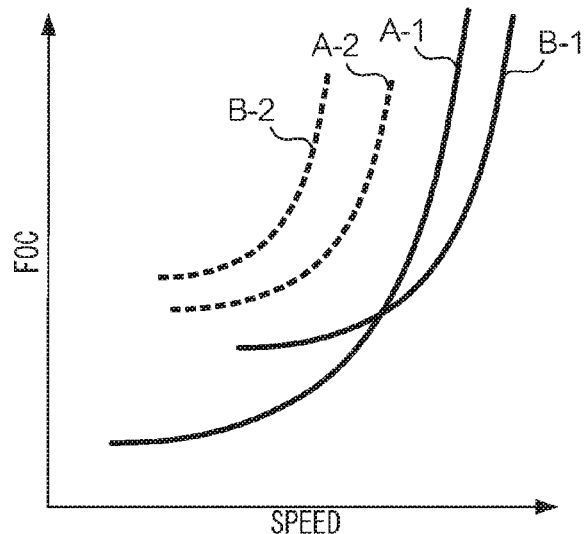
FIG. 4
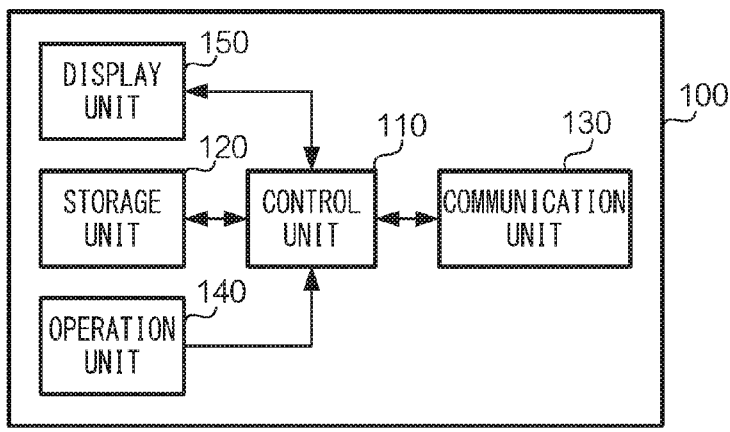
FIG. 5
FIG. 6

| | SHIP NAME | TOTAL FUEL CONSUMPTION |
|---|---|---|
| 1 | A | fa |
| 2 | B | fb |
| ⋮ | ⋮ | ⋮ |

SHIP ASSIGNMENT DEVICE, SHIP ASSIGNMENT METHOD, PROGRAM, AND RECORDING MEDIUM

TECHNICAL FIELD

The present invention pertains to a technique of presenting for selection suitable ships to be used for a shipping service along a specified sailing route.

BACKGROUND

When suitable ships for a shipping service along a specified sailing route are selected from available ships, a cost that will be incurred by each available ship traversing the sailing route is usually considered. For example, it is described in paragraph 0027 of JP Hei-8-272402A that suitable ships for a shipping service are selected based on a cost of each ship including a cost of chartering the ship. According to the invention disclosed JP Hei-8-272402A, ships with comparatively inexpensive cost of chartering are selected for the shipping service, whereby costs incurred for using the shipping service are kept down.

Cost of a voyage varies depending on fuel cost required for the voyage of a ship as well as a cost of chartering the ship. For example, when plural ships are available to sail a specified sailing route and fuel consumption rates of the ships are different from each other, if a ship whose cost of chartering is inexpensive but has a high fuel consumption rate, a quantity of fuel required for the voyage becomes large, and fuel cost required for the voyage increases a total cost of the voyage. In recent years, crude oil prices have frequently soared. In this situation, high fuel consumption and increased fuel cost may cause a serious problem in maintaining businesses of companies providing shipping services.

SUMMARY

In view of the foregoing circumstances, the purpose of the present invention is to provide a technique for presenting for selection suitable ships for a voyage along a specified sailing route selected from candidate ships.

To solve the above explained problem, in the present invention, there is provided a ship assignment device comprising a first acquisition unit that acquires a data set of voyage schedule information indicating an operation time schedule of a voyage and a sailing route of the voyage, a second acquisition unit that acquires a data set of weather information indicating weather related to the operation time schedule of the voyage and the sailing route of the voyage indicated by the data set of voyage schedule information from a first database, a third acquisition unit that acquires a data set of a fuel consumption rate indicating a fuel consumption rate of each of plural ships from a second database that stores data sets each indicating a fuel consumption rate in association with an identifier of a ship from among the plural ships, a calculating unit that calculates a total fuel consumption required for a ship to sail on the sailing route of the voyage indicated by the data set of voyage schedule information following a time schedule of the voyage indicated by the data set of voyage schedule information on the basis of the data set of weather information and the data set of fuel consumption rate of the ship with regard to each of the plural ships, and an output unit that outputs identifiers of ships selected from the plural ships on the basis of a result of the calculation performed by the calculating unit to a device.

In a preferred embodiment of the above mentioned ship assignment device, the output unit may output identifiers of ships sorted in ascending order according to a total fuel consumption calculated by the calculating unit.

In a preferred embodiment of the above mentioned ship assignment device, the data set of voyage schedule information may indicate plural partial sailing routes that are divided from the sailing route of the voyage, the second acquisition unit may acquire data sets each indicating weather related to a partial sailing route from among the plural partial sailing routes, and the calculating unit may calculate a fuel consumption required for each of the plural partial sailing routes, and sum up plural fuel consumptions of the plural partial sailing routes to determine a total fuel consumption required for a ship to sail on the sailing route of the voyage indicated by the data set of voyage schedule information.

In a preferred embodiment of the above mentioned ship assignment device, the data set of fuel consumption rate may indicate a relation between sailing speeds and fuel consumption rates, and the calculating unit may select a fuel consumption rate corresponding to a sailing speed determined by the time schedule of the voyage and the sailing route of the voyage indicated by the data set of voyage schedule information as the fuel consumption rate used for calculating the total fuel consumption.

In addition, in the present invention, there is provided a ship assignment method comprising a first acquisition step for a device to acquire a data set of voyage schedule information indicating an operation time schedule of a voyage and a sailing route of the voyage, a second acquisition step for the device to acquire a data set of weather information indicating weather related to the time schedule of the voyage and the sailing route of the voyage indicated by the data set of voyage schedule information from a first database, a third acquisition step for the device to acquire a data set of a fuel consumption rate indicating a fuel consumption rate of each of plural ships from a second database that stores data sets each indicating a fuel consumption rate in association with an identifier of a ship from among the plural ships, a calculating step for the device to calculate a total fuel consumption required for a ship to sail on the sailing route of the voyage indicated by the data set of voyage schedule information following a time schedule of the voyage indicated by the data set of voyage schedule information on the basis of the data set of weather information and the data set of fuel consumption rate of the ship with regard to each of the plural ships, and an output step for the device to output identifiers of ships selected from the plural ships on the basis of a result of the calculation in the calculating step to a device.

Furthermore, in the present invention, there is provided a program for causing a computer to function as a first acquisition unit that acquires a data set of voyage schedule information indicating an operation time schedule of a voyage and a sailing route of the voyage, a second acquisition unit that acquires a data set of weather information indicating weather related to the time schedule of the voyage and the sailing route of the voyage indicated by the data set of voyage schedule information from a first database, a third acquisition unit that acquires a data set of a fuel consumption rate indicating a fuel consumption rate of each of plural ships from a second database that stores data sets each indicating a fuel consumption rate in association with an identifier of a ship from among the plural ships, a calculating unit that calculates a total fuel consumption required for a ship to sail on the sailing route of the voyage indicated by the data set of voyage schedule information following a time schedule of the voyage indicated by the data set of voyage schedule information on the basis of the data set of weather information and the data set of fuel consumption rate of the ship with regard to each of the plural ships, and an output unit that outputs identifiers of ships selected from the plural ships on the basis of a result of the calculation performed by the calculating unit to a device.

Furthermore, in the present invention, there is provided a computer-readable recording medium recording the above mentioned program.

The present invention allows suitable ships for a voyage on a specified sailing route to be presented to a user for selection.

BRIEF EXPLANATION OF THE DRAWINGS

FIG. 4 A drawing illustrating correspondence between sailing speeds and fuel consumption rates.

FIG. 5 A drawing illustrating weather information stored in ship database 400.

FIG. 6 A drawing illustrating a hardware configuration of ship assignment device 100.

DETAILED DESCRIPTION

Exemplary Embodiment

Figures 1, 2, 3:
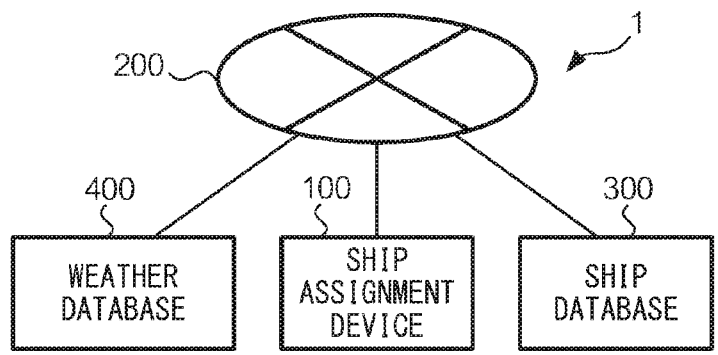
FIG. 1 A drawing illustrating an overall configuration of ship assignment system 1.
FIG. 2 A drawing illustrating information stored in ship database 300.
FIG. 3 A drawing illustrating a sample of a fuel consumption rate table.

FIG. 1 illustrates an overall configuration of ship assignment system 1 according to an exemplary embodiment of the present invention. Ship assignment system 1 is a system for presenting suitable ships for a voyage following a schedule set by a user for selection by the user. The user can easily determine suitable ships for the voyage by referring to the ships presented by ship assignment system 1.

Network 200 is a data communication network for realizing data communications between devices. Network 200 is, for example, a wired data communication network. However, network 200 may contain one or more wireless data communication networks.

Ship database 300 (second database) is a database for managing information on each of plural ships. Ship database 300 contains information on each ship such as a ship name, an overall length, a molded breadth, a deadweight capacity, a molded depth, a full load draft, etc., as illustrated in FIG. 2. Ship database 300 further contains fuel consumption rate tables, each of which is associated with one of the ships. Fuel consumption rate tables contained in ship database 300 are examples of information on variation of fuel consumption rates, and FIG. 3 illustrates a sample of a fuel consumption rate table. Each fuel consumption rate table contains data records each of which contains data sets indicating a wind direction, a wind speed, a wave direction, a wave height, a sailing speed, a fuel consumption rate (for example, fuel consumption per hour), etc.

FIG. 4 illustrates graphs showing examples of correspondences between sailing speeds (Speed) and fuel consumption rates (FOC). Curve A-1 in FIG. 4 is a graph showing a correspondence between sailing speeds and fuel consumption rate under a certain weather condition with regard to a ship named "A" (referred to as "ship A" hereinafter). Curve B-1 is a graph showing a correspondence between sailing speeds and fuel consumption rate under the same weather condition as that of curve A-1 with regard to a ship named "B" (referred to as "ship B" hereinafter). According to curve A-1 and curve B-1, under the certain weather condition, the lowest speed of ship A is lower than the lowest speed of ship B, and fuel consumption rates of ship A are higher than fuel consumption rates of ship B in the upper speed range when sailing speeds of ship A and ship B are the same. Moreover, according to curve A-1 and curve B-1, a speed range of ship A is wider than that of ship B.

Curve A-2 in FIG. 4 is a graph showing a correspondence between sailing speeds and fuel consumption rate with regard to ship A under a weather condition with a higher wave height than that of curve A-1. Curve B-2 is a graph showing a correspondence between sailing speeds and fuel consumption rate under the same weather condition as that of curve A-2 with regard to ship B. According to curve A-2 and curve B-2 in FIG. 4, the lowest limit and the highest limit of sailing speed are decreased when a wave height is increased both in the case of ship A and the case of ship B. Moreover, according to curve A-2 and curve B-2, when a wave height is increased, fuel consumption rates of ship B are higher than those of ship A at the same sailing speed. The information shown in FIG. 4 is a sample, and it does not limit information contained in ship database 300. For example, ship database 300 may contain data indicating any types of information relating to fuel consumption rates of ships such as information on hull fouling, propeller fouling, etc.

Weather database 400 (first database) is a database storing data sets indicating plural types of weather information. FIG. 5 illustrates samples of data sets stored in weather database 400. Weather database 400 stores, for example, with regard to each date, each month or each season, and with regard to each sea area, data sets indicating statistical information on average wind direction, average wind speed, average wave direction, average wave height, etc. as weather information. The weather information may include data sets indicating statuses of any other types of weather such as oceanic currents, tidal currents, etc.

Ship assignment device 100 is a device that presents suitable ships for a voyage schedule set by a user for selection by the user. Ship assignment device 100 acquires data sets from ship database 300 and weather database 400, and displays information on the suitable ships for the voyage schedule set by the user. The information on ships that is displayed by ship assignment device 100 may include, for example, ship names each uniquely identifying a ship, wherein names of the more suitable ships are shown higher in a list. The information on ships that is displayed by ship assignment device 100 should not be limited to ship names, and it may include any other information on ships such as maximum sailing speeds, deadweight capacities, etc.

FIG. 6 is a block diagram illustrating a hardware configuration of ship assignment device 100. Ship assignment device 100 is a computer device that executes programs, and it has control unit 110, storage unit 120, communication unit 130, operation unit 140 and display unit 150. Ship assignment device 100 may be any type of computer device such as a personal computer.

Storage unit 120 is a device that stores various programs and data sets. Storage unit 120 may have, for example, a hard disk drive that stores, for example, programs executed by control unit 110 and data sets used by control unit 110. The programs stored in storage unit 120 include a program that realizes a function of ship assignment device 100 for presenting suitable ships for a voyage schedule set by a user for selection by the user.

Communication unit 130 is connected to network 200, and it is controlled by control unit 110. Under the control of control unit 110, communication unit 130 communicates with devices connected to network 200, and exchanges data sets with the devices. Communication unit 130 receives data sets indicating information on ships transmitted from ship database 300. Moreover, communication unit 130 receives data sets indicating information on weather transmitted from weather database 400.

Operation unit 140 has one or more devices operated by a user such as a mouse and a keyboard. A user may input various data sets to ship assignment device 100 using operation unit 140. Operation unit 140 may have, for example, a touch display instead of a mouse or a keyboard.

Display unit 150 is a device that displays various types of information. Display unit 150 has a displaying device such as a liquid crystal display, and displays information provided by control unit 110. Display unit 150 may be configured as an information outputting device that outputs information to be displayed to a user to an external displaying device such as a liquid crystal display and a projector. In such a case, display unit 150 does not have to have the displaying device provided internally.

Control unit 110 has CPU (Central Processing Unit), RAM (Random Access Memory), etc., and controls other components of ship assignment device 100 by executing programs stored in storage unit 120. When control unit 110 executes certain programs stored in storage unit 120, the function for presenting suitable ships for a voyage schedule input by a user for selection by the user is realized.

Figure 7:
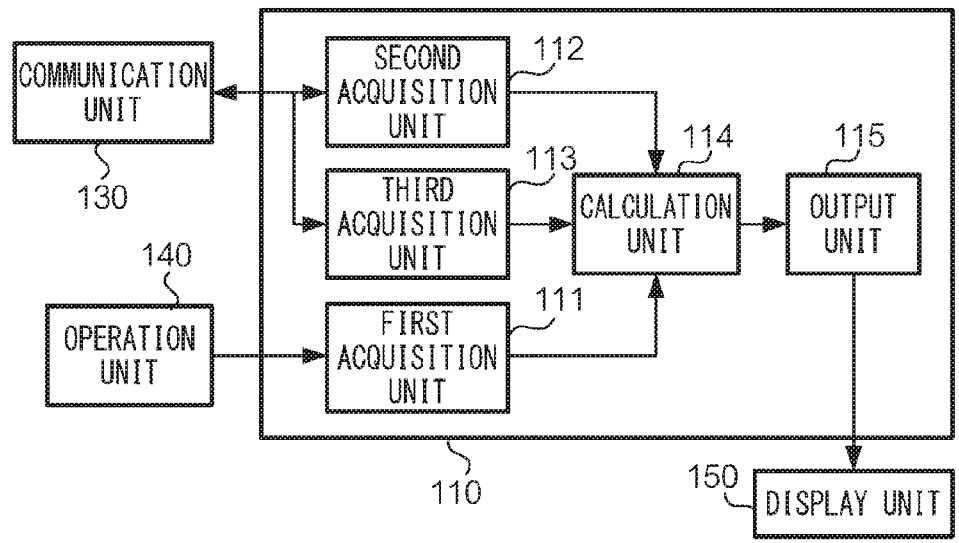
FIG. 7 A drawing illustrating a functional configuration of ship assignment device 100.

FIG. 7 is a block diagram illustrating a functional configuration of control unit 110 that is realized when control unit 110 executes the certain programs. Namely, when control unit 110 executes the certain programs stored in storage unit 120, first acquisition unit 111, second acquisition unit 112, third acquisition unit 113, calculating unit 114 and output unit 115 are realized.

First acquisition unit 111 is a unit for acquiring information input by a user by use of operation unit 140. The user inputs by use of operation unit 140, for example, data sets indicating a sailing route and an operation time schedule, i.e. when a ship is scheduled to arrive at or depart from each point on the sailing route, as voyage schedule information. First acquisition unit 111 acquires the voyage schedule information input by the user by use of operation unit 140. First acquisition unit 111 inputs the acquired voyage schedule information to calculating unit 114. Data sets input by the user may indicate, for example, a name of departure port, a name of destination port, a distance from the departure port to the destination port, names of sea areas on the sailing route, etc., as information on the sailing route. Data sets input by the user may further indicate, for example, a date of departure from the departure port, a date of arrival at the destination port, a date of sailing in each sea area on the sailing route, etc., as information on the sailing time schedule.

Second acquisition unit 112 is a unit for acquiring weather information from weather database 400. Second acquisition unit 112 receives data sets indicating weather in each sea area on the sailing route specified by the voyage schedule information at a timing when a ship sails the sea area specified by the voyage schedule information from weather database 400. Second acquisition unit 112 forwards the acquired data sets of weather information to calculating unit 114.

Third acquisition unit 113 is a unit for acquiring information stored in ship database 300. Third acquisition unit 113 receives data sets indicating several types of information on ships such as information shown in FIGS. 2 and 3 from ship database 300.

Calculating unit 114 is a unit for calculating, for each ship whose information is stored in ship database 300, a fuel consumption required to sail on the sailing route in accordance with the voyage schedule information on the basis of information acquired by first acquisition unit 111, second acquisition unit 112 and third acquisition unit 113. More concretely, calculating unit 114 calculates, with regard to each ship whose information is stored in ship database 300, a fuel consumption of the ship when the ship sails on a sailing route indicated by data sets of schedule information acquired by first acquisition unit 111, following a sailing time schedule indicated by the data set of schedule information acquired by first acquisition unit 111, by use of data sets of weather information acquired by second acquisition unit 112, and data sets of ship information acquired by third acquisition unit 113.

Output unit 115 is a unit for outputting data sets indicating results of calculations executed by calculating unit 114. Output unit 115 outputs data sets indicating information generated based on results of calculations executed by calculating unit 114 to display unit 150. In this exemplary embodiment, output unit 115 outputs, for example, data sets indicating a screen showing names of suitable ships for the voyage acquired from ship database 300 to output unit 115.

Figure 8:
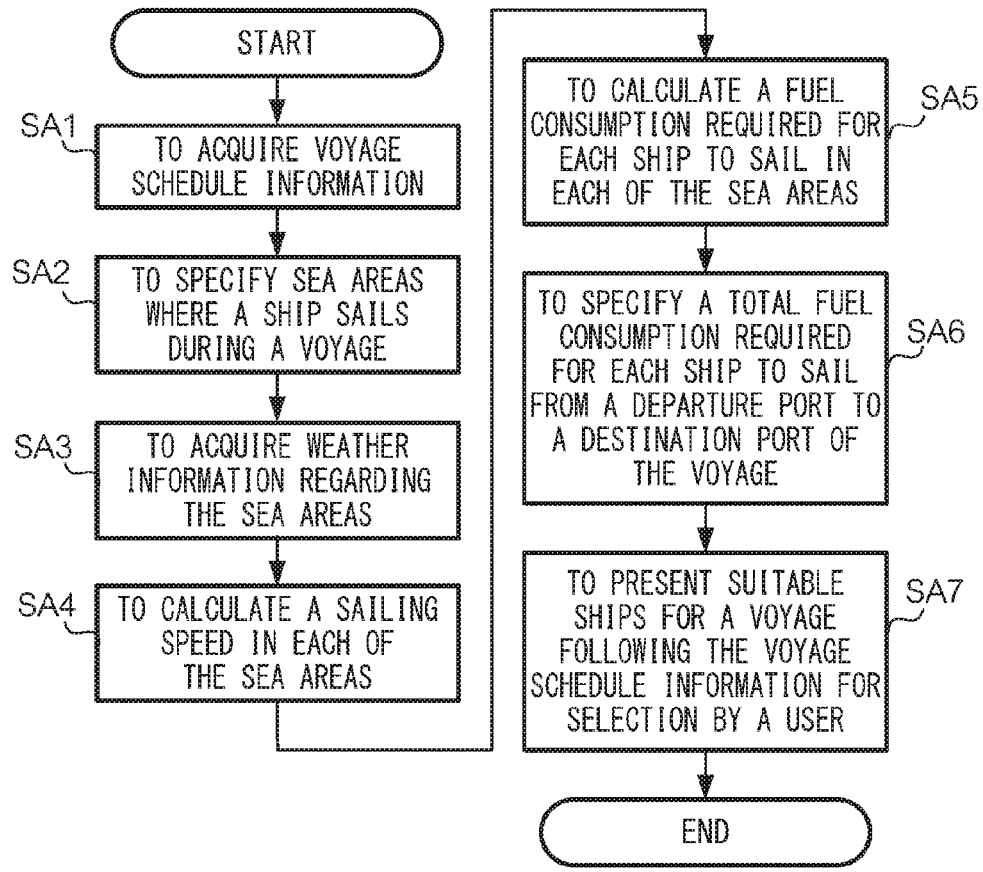
FIG. 8 A drawing illustrating a flowchart of processes performed by control unit 110.

Exemplary operations performed by ship assignment system 1 are explained below. FIG. 8 is a flowchart showing processes performed by control unit 110 for presenting suitable ships for a voyage defined by voyage schedule information input by a user for selection by the user.

When a user of ship assignment system 1 wishes to know suitable ships for a voyage on a specified sailing route following a certain voyage time schedule, the user inputs various types of information as voyage schedule information, such as a name of departure port, a name of destination port, a distance from the departure port to the destination port, names of sea areas on the sailing route, a date of departure from the departure port, a date of arrival at the destination port, a date of sailing in each of the sea areas, etc. by use of operation unit 140. Control unit 110 acquires data sets indicating the information input by the user by use of operation unit 140 (step SA1).

Next, control unit 110 calculates, with regard to each of ships whose information is stored in ship database 300, a fuel consumption required for the ship to sail from the departure port to the destination port specified by the voyage schedule information following the voyage time schedule specified by the voyage schedule information.

Figures 9, 10:
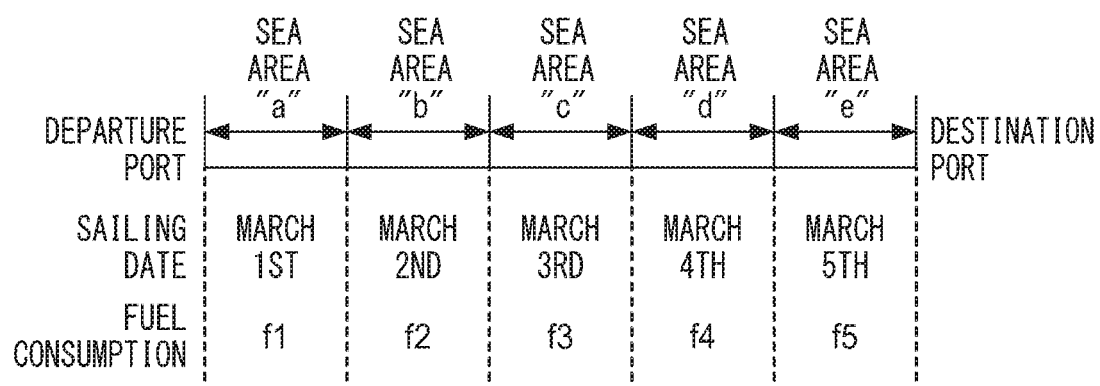
FIG. 9 A drawing illustrating sea areas between a departure port and a destination port.
FIG. 10 A drawing illustrating a sample of a screen displayed in display unit 150.

More concretely, control unit 110 specifies sea areas on the sailing route from the departure port to the destination port on the basis of information on sea areas included in the voyage schedule information (step SA2). Next, control unit 110 acquires data sets indicating weather in each of the sea areas specified in step SA2 at a timing when the ship sails in the sea area specified by the voyage schedule information from weather database 400 (step SA3). For example, control unit 110 specifies sea areas "a" to "e" between the departure port and the destination port and specifies a date when the ship sails each of the specified sea areas as shown in FIG. 9. In the case shown in FIG. 9, control unit 110 acquires data sets indicating weather in sea area "a" on March 1st, and data sets indicating weather in sea area "b" on March 2nd. Control unit 110 also acquires data sets indicating weather in sea areas "c" to "e" on their corresponding dates.

Moreover, control unit 110 specifies, with regard to each of the sea areas specified in step SA2, a distance of sailing of the ship in the sea area, and calculates a sailing speed in the sea area by use of the specified distance (step SA4). Next, control unit 110 calculates, with regard to each of the ships whose information is stored in ship database 300, a fuel consumption required for sailing each of the sea areas specified in step SA2 by use of the sailing speed calculated regarding the sea area, data sets included in the fuel consumption table shown in FIG. 3 acquired from ship database 300, and the acquired data sets of weather in the sea area (step SA5). More concretely, control unit 110 specifies a fuel consumption rate related to the calculated sailing speed and the acquired data sets of weather from ship database 300, and calculates a fuel consumption for the sea area by use of the specified fuel consumption rate.

For example, when a combination of weather conditions of sea area "a" and a calculated sailing speed in sea area "a" are indicated in the first data record of the data table corresponding to ship "A" shown in FIG. 3, control unit 110 acquires a data set indicating a fuel consumption rate such as a fuel consumption required for one hour stored in the first data record. When weather conditions in, for example, sea area "a" cannot found in the fuel consumption table, control unit 110 may acquire a data set indicating a fuel consumption rate stored in a data record that indicates weather conditions similar to the weather conditions of sea area "a."

Control unit 110 calculates a fuel consumption required for a sailing for a day based on a fuel consumption rate, i.e. a fuel consumption required for a sailing for an hour. Control unit 110 calculates a fuel consumption for each combination of a ship and one of sea areas "a" to "e." In this way, control unit 110 acquires a fuel consumption for each combination of a ship and one of sea areas "a" to "e" as shown in FIG. 9.

After control unit 110 completes the process in step SA5, it sums up the fuel consumptions calculated for the sea areas to determine a total fuel consumption required for a voyage from the departure port to the destination port with regard to each of the ships (step SA6). After control unit 110 determines a total fuel consumption with regard to each of the ships, presents the ships sorted in ascending order according to a total fuel consumption to the user (step SA7). More concretely, control unit 110 generate data sets indicating a screen showing a table where ship names, i.e. identifiers of ships, are listed in ascending order according to a total fuel consumption, and outputs the generated data sets indicating the screen to display unit 150.

FIG. 10 illustrates a sample of a screen displayed by display unit 150. As shown in FIG. 10, in the screen displayed by display unit 150, ship names are shown in ascending order according to a total fuel consumption required for a voyage performed by a ship identified by the ship name. Accordingly, the user of ship assignment device 100 can discern which ships that are suitable from the view point of fuel cost for a specified voyage input by the user.

In this embodiment, the user may input some conditions of a ship for performing the voyage such as a deadweight capacity, a maximum number of loadable containers, etc. together with the voyage schedule information, and ship assignment device 100 may select ships that meet the input conditions to be presented to the user. In this case, for example, when a condition that a deadweight capacity is more than or equal to "a" tons is input by the user, any ship name of a ship whose deadweight capacity is less than "a" tons is not shown by display unit 150. For example, when a condition that a maximum number of loadable containers is more than or equal to "b" is input by the user, any ship name of a ship whose maximum number of loadable containers is less than "b" is not shown by display unit 150.

Modifications

The above-explained embodiment is one exemplary embodiment of the present invention that does not limit a scope of the present invention. Namely, the above explained embodiment may be implemented in various modified forms within the present invention. In the following part, some examples of such modifications are explained. Two or more of the following modifications may be combined.

The present invention is not limited with regard to a method of calculating of a fuel consumption in connection with each ship by the above explained embodiment, and any suitable method may be utilized. For example, if a hull or a propeller of a ship is fouled by shellfish, seaweed, or the like, the fouling increases resistance when the ship sails, and more fuel is required for the voyage as compared to the case where there is no fouling. Accordingly, ship database 300 may store a data set indicating an extent of fouling for each ship, and control unit 110 may amend a total fuel consumption required for a voyage of the ship on the basis of the extent of fouling indicated for the ship. Moreover, control unit 110 may amend the total fuel consumption on the basis of other parameters such as an overall length of the ship, a molded breadth of the ship, etc. Namely, ship database 300 may store data sets indicating any types of parameters that affect fuel consumption for a voyage of a ship, and control unit 110 may calculate a fuel consumption required for a voyage or modify the calculated fuel consumption by use of the parameters.

In the above-explained embodiment, ship names are shown in ascending order according to a value representing a total fuel consumption required for the voyage. The present invention is not limited with respect to this point, and ship database 300 may store, for example, a data set indicating a cost of chartering each ship, and ship assignment device 100 may add the cost of chartering to a fuel cost covering a calculated total fuel consumption for the voyage and cause display unit 150 to display a screen where ship names are shown in ascending order according to a result of the calculation.

In the above-explained embodiment, ship database 300 and weather database 400 are different devices from ship assignment device 100, and weather database 400 acquires data sets from each of ship database 300 and weather database 400 via network 200. The present invention is not limited with respect to this point. For example, storage unit 120 may also function as ship database 300 and weather database 400. In this case, control unit 110 may acquire data sets from storage unit 120 functioning as ship database 300 and weather database 400.

In the above-explained embodiment, control unit 110 calculates a total fuel consumption with regard to each ship whose information is stored in ship database 300. The present invention is not limited with respect to this point. For example, the user may input a ship name together with the voyage schedule information by use of operation unit 140, and control unit 110 may calculate a total fuel consumption required for the voyage with regard to the ship identified by the input ship name, and display unit 150 may display a screen showing the calculated total fuel consumption of the ship.

Instead of a user inputting data sets indicating a sailing route to ship assignment device 100, the data sets indicating candidate sailing routes may be stored in storage unit 120 in advance. In this case, ship assignment device 100 may display a list of sailing routes, and the user may select a sailing route from the list.

In the above-explained embodiment, a user inputs voyage schedule information to ship assignment system 1 by operating ship assignment device 100, and ship assignment device 100 presents suitable ships for a voyage in accordance with the voyage schedule information to the user. The present invention is not limited with respect to this point. For example, ship assignment device 100 is configured as a server device, and a user may input data sets indicating voyage schedule information to a terminal device functioning as a client device. In this case, the data sets input by the user to the terminal device are transmitted to ship assignment device 100, and a data set indicating a total fuel consumption required for the voyage with regard to each ship calculated by ship assignment device 100 is transmitted to the terminal device. Then, the terminal device displays a screen showing names of suitable ships for the voyage based on the data sets received from ship assignment device 100.

A user may input a data set indicating a sailing speed at which a ship sails in each sea area to ship assignment device 100. In this modification, control unit 110 does not need to calculate a sailing speed in each sea area in step SA4, and calculate a total fuel consumption of each ship by use of a sailing speed in each sea area indicated by the data set input by the user in step SA5.

In the above-explained embodiment, the voyage schedule information indicates a schedule of a voyage in which a ship sails from a departure port to a destination port only once. The voyage schedule information input to ship assignment device 100 is not limited with respect to this point.

The voyage schedule information input to ship assignment device 100 may, for example, indicate a voyage in which a ship repeats a return voyage between port A and port B every two weeks for a half year. In this case, ship assignment device 100 may acquire weather information on each sea area between port A and port B in the half year, and calculate a total fuel consumption required for the voyage with respect to each ship by use of the acquired weather information.

In another case, if the voyage schedule information input to ship assignment device 100 indicates, for example, a voyage in which a ship sails on a sailing route from a departure port to a destination port visiting several ports on the sailing route within two months, ship assignment device 100 specifies sea areas between each pair of neighboring ports on the sailing route, and acquires weather information on each of the specified sea areas at each timing of sailing in the sea area within the two months. Then, ship assignment device 100 calculates a total fuel consumption for each ship using the acquired weather information.

In another case, if the voyage schedule information input to ship assignment device 100 indicates, for example, a voyage in which a ship repeats voyages from a departure port to a destination port visiting several ports on the sailing route in two months several times, ship assignment device 100 specifies sea areas between each pair of neighboring ports on the sailing route, and acquires weather information on each of the specified sea areas at each timing of sailing in the sea area in each of the repeated voyages. Then, ship assignment device 100 calculates a total fuel consumption for each ship using the acquired weather information.

A program that realizes a function according to the present invention may be provided in a form being stored in a computer-readable recording medium such as a magnetic recording medium, i.e. a magnetic tape, a magnetic disk such as HDD (Hard Disk Drive) and FD (Flexible Disk), etc., an optical recording medium such as a laser disk, a magneto-optical recording medium, a semiconductor memory, etc., and read from the recording medium to be installed in ship assignment device 100. Alternatively, the program may be downloaded from a server to ship assignment device 100 via network 200 and installed in ship assignment device 100.

DESCRIPTION OF REFERENCE NUMERALS

1 . . . ship assignment system, 100 . . . ship assignment device, 110 . . . control unit, 111 . . . first acquisition unit, 112 . . . second acquisition unit, 113 . . . third acquisition unit, 114 . . . calculating unit, 115 . . . output unit, 120 . . . storage unit, 130 . . . communication unit, 140 . . . operation unit, 150 . . . display unit, 200 . . . network, 300 . . . ship database (second database), 400 . . . weather database (first database).

What is claimed is:

1. A ship assignment device comprising:
a control unit;
a storage unit; and
a communication unit;
the control unit being configured to:
acquire a first data set of voyage schedule information indicating an operation time schedule of a voyage and a sailing route of the voyage;
acquire a second data set of weather information indicating weather related to the operation time schedule of the voyage and the sailing route of the voyage indicated by the first data set of voyage schedule information from a first database;
acquire a third data set of a fuel consumption rate indicating a fuel consumption rate of each of plural ships from a second database that stores data sets each of which relates to a ship from among the plural ships and contains weather information, a sailing speed and a fuel consumption rate, the fuel consumption rate being achieved when the ship sails at the sailing speed in a weather state indicated by the weather information;
calculate a total fuel consumption required for a ship to sail on the sailing route of the voyage indicated by the first data set of voyage schedule information following an operation time schedule of the voyage indicated by the first data set of voyage schedule information on the basis of the second data set of weather information and the third data set of fuel consumption rate of the ship with regard to each of the plural ships; and
output identifiers of ships selected from the plural ships on the basis of a result of the calculation of total fuel consumption.

2. The ship assignment device according to claim 1, wherein:
the control unit is further configured to:
output the identifiers of ships sorted in ascending order according to a result of the calculation of total fuel consumption.

3. The ship assignment device according to claim 1, wherein:
the first data set of voyage schedule information indicates plural partial sailing routes that are divided from the sailing route of the voyage;
the second data set of weather information indicating weathers each related to a partial sailing route from among the plural partial sailing routes; and
the control unit is further configured to:
calculate a fuel consumption required for each of the plural partial sailing routes, and sums up plural fuel consumptions of the plural partial sailing routes to determine the total fuel consumption required for a ship to sail on the sailing route of the voyage indicated by the first data set of voyage schedule information.

4. The ship assignment device according to claim 1, wherein:
the third data set of fuel consumption rate indicates a relation between sailing speeds and fuel consumption rates; and
the control unit is further configured to:
select a fuel consumption rate corresponding to a sailing speed determined by the operation time schedule of the voyage and the sailing route of the voyage indicated by the first data set of voyage schedule information as the fuel consumption rate used for calculating the total fuel consumption.

5. A ship assignment method comprising:
providing a control unit;
providing a storage unit;
providing a communication unit;
acquiring, by the control unit, a first data set of voyage schedule information indicating an operation time schedule of a voyage and a sailing route of the voyage;
acquiring, by the control unit, a second data set of weather information indicating weather related to the operation time schedule of the voyage and the sailing route of the voyage indicated by the first data set of voyage schedule information from a first database;
acquiring, by the control unit, a third data set of a fuel consumption rate indicating a fuel consumption rate of each of plural ships from a second database that stores data sets each of which relates to a ship from among the plural ships and contains weather information, a sailing speed and a fuel consumption rate, the fuel consumption rate being achieved when the ship sails at the sailing speed in a weather state indicated by the weather information;
calculating, by the control unit, a total fuel consumption required for a ship to sail on the sailing route of the voyage indicated by the first data set of voyage schedule information following an operation time schedule of the voyage indicated by the first data set of voyage schedule information on the basis of the second data set of weather information and the third data set of fuel consumption rate of the ship with regard to each of the plural ships; and
outputting, by the control unit, identifiers of ships selected from the plural ships on the basis of a result of the calculation of total fuel consumption.

6. A program stored on a non-transitory computer readable media, the program for causing a computer to:
acquire a first data set of voyage schedule information indicating an operation time schedule of a voyage and a sailing route of the voyage;
acquire a second data set of weather information indicating weather related to the operation time schedule of the voyage and the sailing route of the voyage indicated by the first data set of voyage schedule information from a first database;
acquire a third data set of a fuel consumption rate indicating a fuel consumption rate of each of plural ships from a second database that stores data sets each of which relates to a ship from among the plural ships and contains weather information, a sailing speed and a fuel consumption rate, the fuel consumption rate being achieved when the ship sails at the sailing speed in a weather state indicated by the weather information;
calculate a total fuel consumption required for a ship to sail on the sailing route of the voyage indicated by the first data set of voyage schedule information following an operation time schedule of the voyage indicated by the first data set of voyage schedule information on the basis of the second data set of weather information and the third data set of fuel consumption rate of the ship with regard to each of the plural ships; and
output identifiers of ships selected from the plural ships on the basis of a result of the calculation of total fuel consumption.

7. A non-transitory computer-readable recording medium recording the program according to claim 6.

* * * * *